K. C. WOLCOTT.
STUMP PULLER.
APPLICATION FILED MAR. 25, 1920.

1,418,119.

Patented May 30, 1922.
2 SHEETS—SHEET 1.

Inventor:
K. C. Wolcott

By Attorney.

K. C. WOLCOTT.
STUMP PULLER.
APPLICATION FILED MAR. 25, 1920.

1,418,119.

Patented May 30, 1922.
2 SHEETS—SHEET 2.

Inventor:
K. C. Wolcott
Franklin N. Hough
By Attorney.

UNITED STATES PATENT OFFICE.

KARL C. WOLCOTT, OF FLORAHOME, FLORIDA.

STUMP PULLER.

1,418,119.  Specification of Letters Patent.  Patented May 30, 1922.

Application filed March 25, 1920. Serial No. 368,593.

*To all whom it may concern:*

Be it known that I, KARL C. WOLCOTT, a citizen of the United States, residing at Florahome, in the county of Putnam and State of Florida, have invented certain new and useful Improvements in Stump Pullers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a novel construction of stump puller, which will be simple in construction and thoroughly efficient in operation.

The invention in its preferred form is clearly shown in the accompanying drawings, in which.

Figure 1:
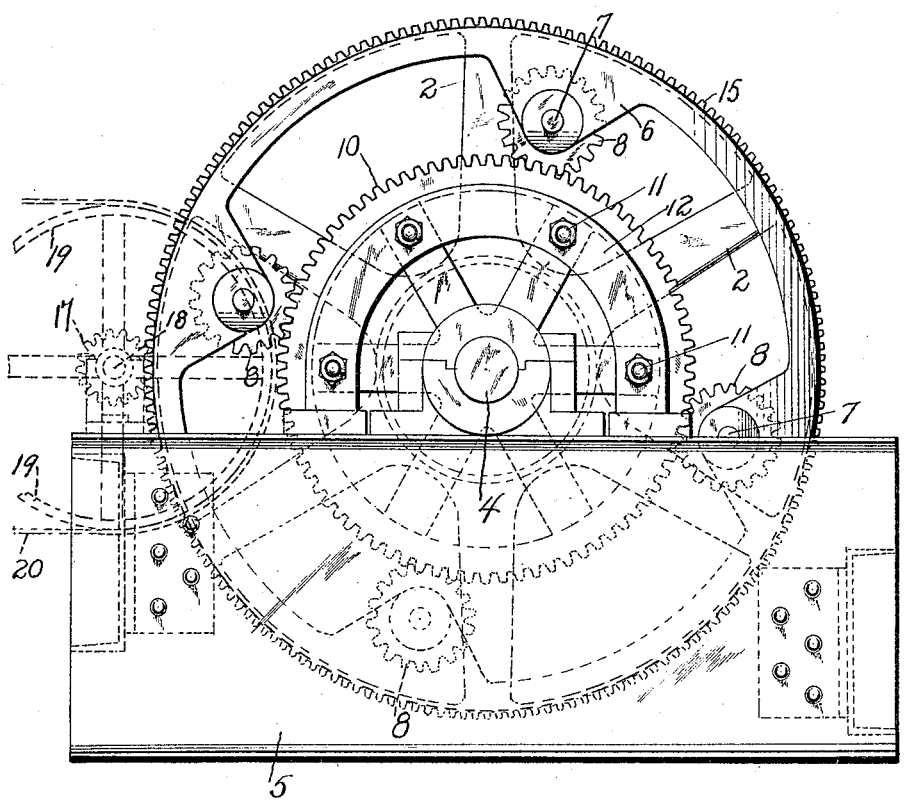
Figure 1 is a side elevation of a stump pulling device embodying the features of my invention.
Figure 2:
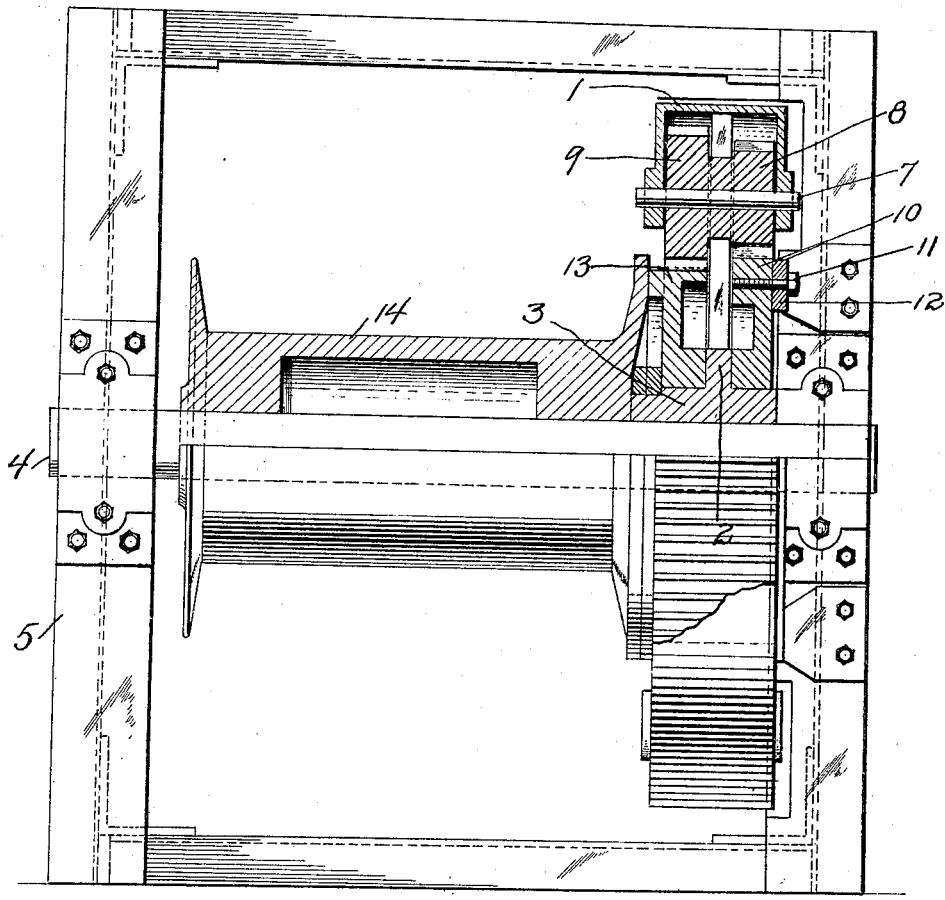
Figure 2 is a view in end elevation, partly in section.
Figure 3:
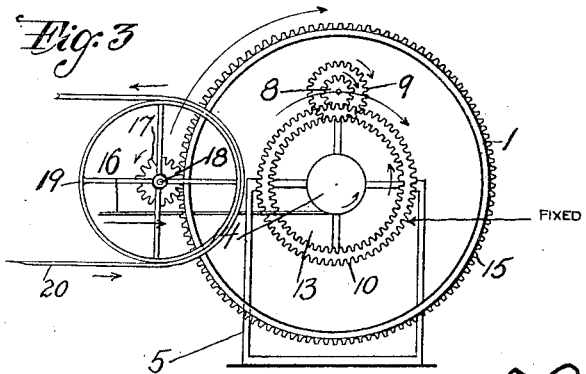
Figure 3 is a diagrammatic view.

Referring now in detail to the drawings:

1 designates a master wheel, provided with spokes 2 radiating from the hub 3 revolubly mounted on a shaft 4, suitably supported in bearings in a frame 5. Said master wheel is provided with marginal inward projecting ears 6 constituting bearings for the shafts 7, each shaft supporting fixedly joined pinions 8 and 9 of unequal pitch diameters. The pinions 8 mesh with a stationary gear 10 concentric with the hub 3 and mounted thereon, and suitably secured against revoluble movement, as by means of bolts 11 passing through portions 12 of the frame 5. The pinions 9 mesh with a gear 13 revolubly mounted on the hub 3, said gear 13 being rotatable with a drum 14 on the shaft.

On the outside of the master wheel are gear teeth 15, in which meshes a pinion 17 on a jack shaft 18, and on said jack shaft is a pulley 19, and over this pulley passes a belt 20, driven by a suitable source of power, not shown.

Secured to the drum 14, so as to be wound thereon, is a flexible connection 16, such as rope or chain, which may be wound around the stump to be pulled.

In operation, it will be noted that as the master wheel 1 is driven by the pinion 17, the pinions 8 travel around the stationary gear 10 and are thus rotated, said movement of rotation being imparted to the pinions 9 meshing with the revoluble gear 13, which is thus driven. The movement of rotation of the gear 13 is imparted to the drum 14 which winds up the rope or chain thereon, thus extracting the stump at the other end of such chain.

What I claim to be new is:

1. In a stump pulling device, a spoked driver adapted to receive power at its periphery, inwardly extending ears carried by the driver in juxtaposition to the spokes, a fixed gear on one side of the spokes and a revoluble drum on the other side of the spokes, the drum provided with gear teeth, planet pinions in pairs, each member of a pair integrally joined with the other member with a reduced diameter between the members of the pair, the pinions carried by the ears with the spokes extending into the channel made by the reduced portion, one of the pinions of each pair co-meshing with the fixed gear and the other of the pinions co-meshing with the teeth of the drum.

2. In a stump pulling device, in combination with a driven gear, a driver provided with spokes and carrying a planetary pinion on each side of the spokes, the pinions integrally joined and bearing on the spokes, a fixed gear co-meshing with one of the pinions on one side of the driver gear, and the driven gear co-meshing with the other pinion on the other side of the driver gear, and ears upon the driver journalling the overhang of the pinions.

In testimony whereof I hereunto affix my signature.

KARL C. WOLCOTT.